No. 698,860. Patented Apr. 29, 1902.
L. D. SAXTON.
TIRE.
(Application filed Sept. 16, 1901.)
(No Model.)
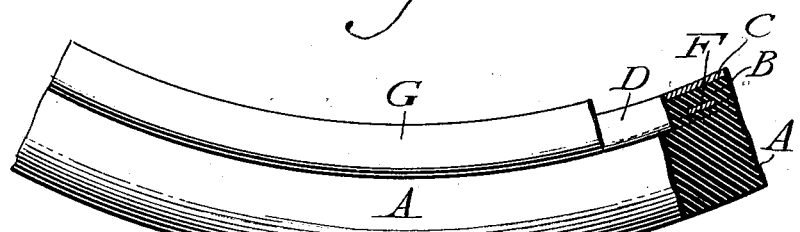
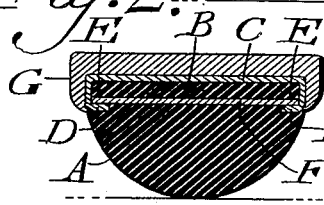 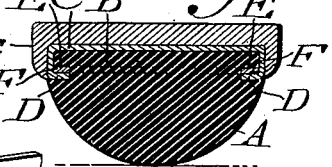
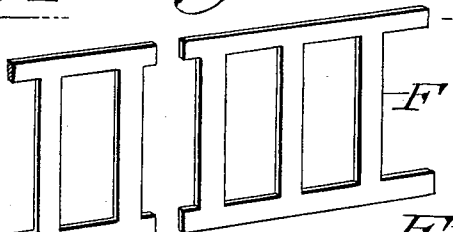
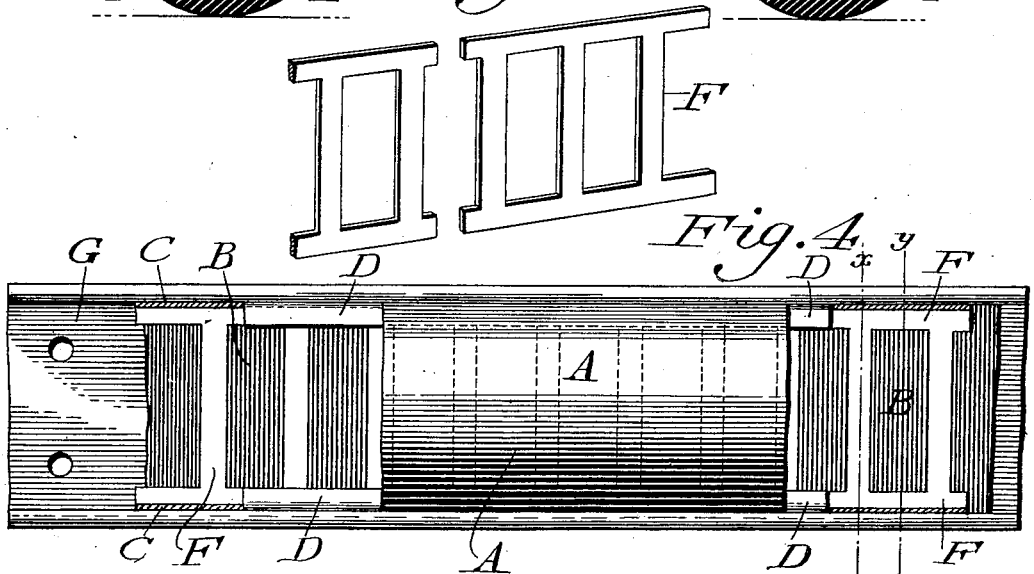
Witnesses
Inventor
Lionel D. Saxton
By Diedersheim + Fairbank
Attorneys

UNITED STATES PATENT OFFICE.

LIONEL D. SAXTON, OF PHILADELPHIA, PENNSYLVANIA.

TIRE.

SPECIFICATION forming part of Letters Patent No. 698,860, dated April 29, 1902.

Application filed September 16, 1901. Serial No. 75,459. (No model.)

*To all whom it may concern:*

Be it known that I, LIONEL D. SAXTON, a citizen of the United States, residing in the city and county of Philadelphia, State of Pennsylvania, have invented a new and useful Improvement in Tires, of which the following is a specification.

My invention consists of a tire having a tread provided with a base and side shoulders and a channel in which said base is inserted and to which it is secured by the turned-in flanges of said channel, and a plate, frame, or piece of rigid material which rests upon shoulders of the tread and which is engaged by the flanges of the channel, thus firmly connecting the tread with said channel, strengthening the base of the tread, and preventing creeping of the latter.

Figure 1 represents a partial side elevation and partial section of a portion of a tire embodying my invention. Figs. 2 and 3 represent transverse sections, respectively, on lines *x x* and *y y*, Fig. 4. Fig. 4 represents a plan view thereof. Fig. 5 represents a perspective view of the slatted plate employed.

Similar letters of reference indicate corresponding parts in the figures.

Referring to the drawings, A designates the tread of the tire, the same being formed of soft rubber or other suitable material, having on its inner face the base B, which is seated in the channeled plate C, the latter having on the sides thereof the inturned flanges D, which extend in the longitudinal direction of said plate and engage with said base, it being noticed that the sides of said base have recesses or grooves therein, forming the shoulders E.

In the base B of the tread is the slatted plate or frame F, which may be continuous or broken at intervals, the same being vulcanized in the mass comprising the tire. The sides of said frame rest upon the shoulders E and are engaged by the inturned flanges D, so that the latter are in a measure compressed against the shoulders E, thus firmly securing the tread with the plate C, it being noticed that said sides of the frame F form rigid foundations for said flanges and said frame strengthens the base, and consequently the tread, and prevents creeping of the latter, while not materially interfering with the resiliency of the tire, it being evident that a strong, durable, and practical tire is produced.

G designates the channeled rim of the tire, the same receiving the plate C and having the same rigidly secured thereto, the flanges on the sides of said rim firmly embracing the flanges on the sides of the plate C, thus sustaining the latter and firmly connecting it therewith.

Having thus described my invention, what I claim as new, and desire to secure by Letters Patent, is—

1. A tire having a tread provided with a base and shoulders, upon which shoulders rests a piece of rigid material, portions of which run through the tire at the shoulders and are vulcanized in the mass comprising the tire, and a channeled plate adapted to receive said base and having its side portions engage said piece.

2. In a tire having a tread provided with a base and side shoulders, and a channeled plate adapted to receive said base and provided with inturned flanges which engage said shoulders, a piece of rigid material embedded in the tread and resting against said shoulders, the side portions of said channeled plate engaging said piece at said shoulders.

3. A tire consisting of a tread provided with a base and side shoulders, a channeled plate receiving said base and having inturned flanges on the sides thereof, and a slatted frame of rigid material in said base resting against said shoulders and being engaged by said flanges.

4. A tire consisting of a tread provided with a base and side shoulders, a channeled plate receiving said base and having inturned flanges on the sides thereof, a slatted frame of rigid material in said base resting against said shoulders and being engaged by said flanges, and a channeled rim receiving said plate and having the latter firmly connected therewith.

LIONEL D. SAXTON.

Witnesses:
JOHN A. WIEDERSHEIM,
E. HAYWARD FAIRBANKS.